June 29, 1965
L. V. JACOBSON ETAL
3,191,340
AMUSEMENT AND EDUCATIONAL DEVICE FOR SELECTIVELY DISPLAYING
PICTURES BEHIND A TRANSPARENT CONTAINER CONTAINING
LOOSE, SHIFTABLE PIECES
Filed March 19, 1962
2 Sheets-Sheet 1
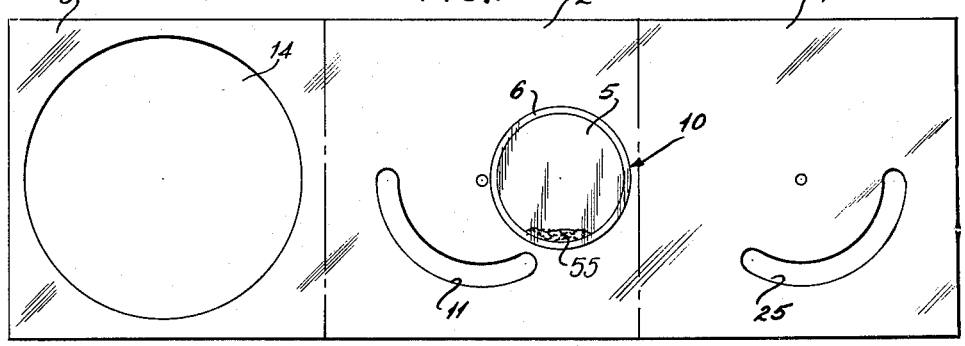
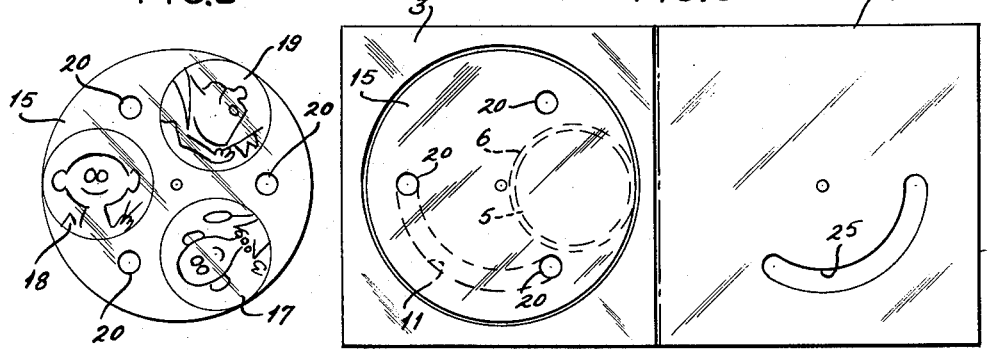
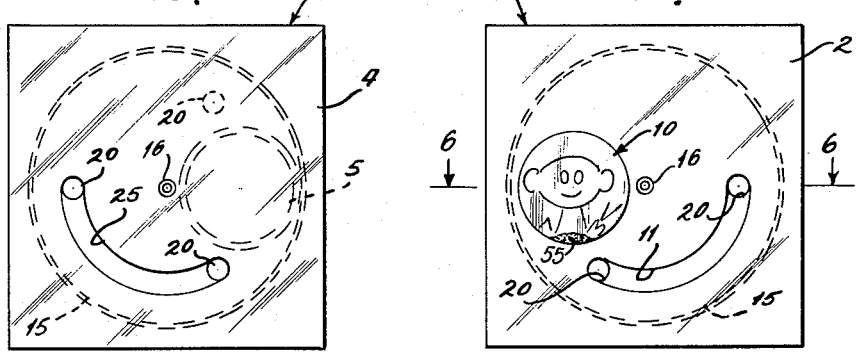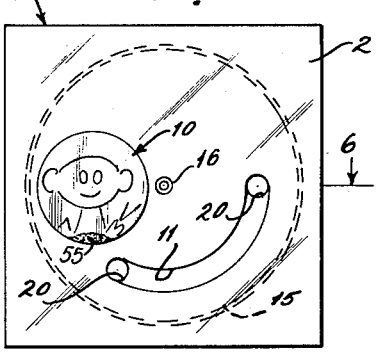
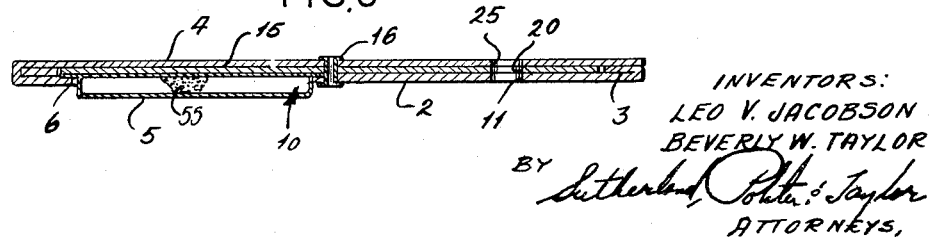
INVENTORS:
LEO V. JACOBSON
BEVERLY W. TAYLOR
BY
ATTORNEYS.

June 29, 1965   L. V. JACOBSON ETAL   3,191,340
AMUSEMENT AND EDUCATIONAL DEVICE FOR SELECTIVELY DISPLAYING
PICTURES BEHIND A TRANSPARENT CONTAINER CONTAINING
LOOSE, SHIFTABLE PIECES
Filed March 19, 1962   2 Sheets-Sheet 2
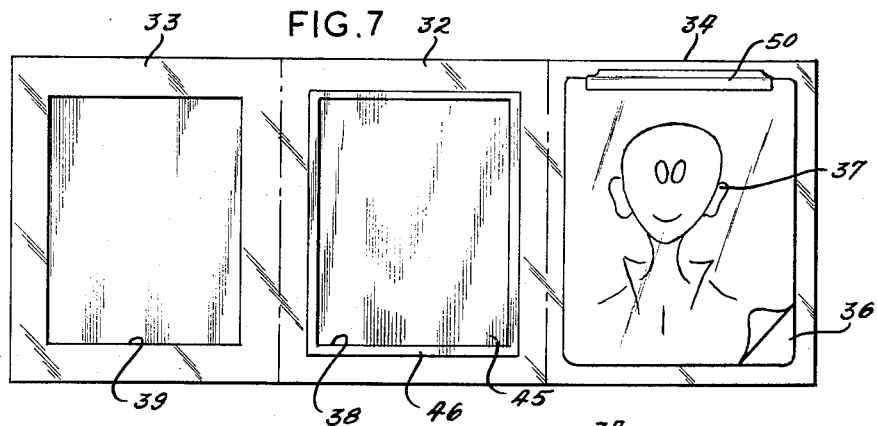
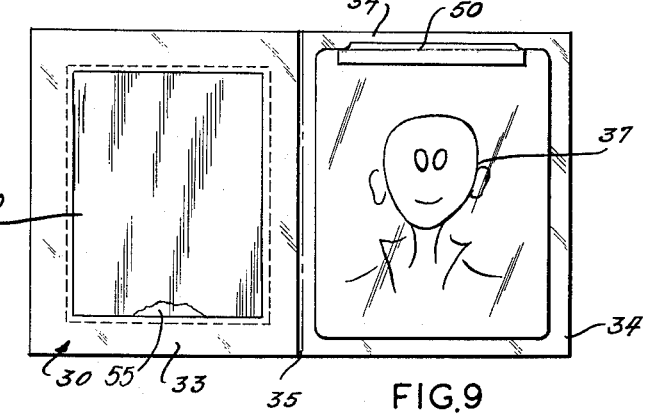
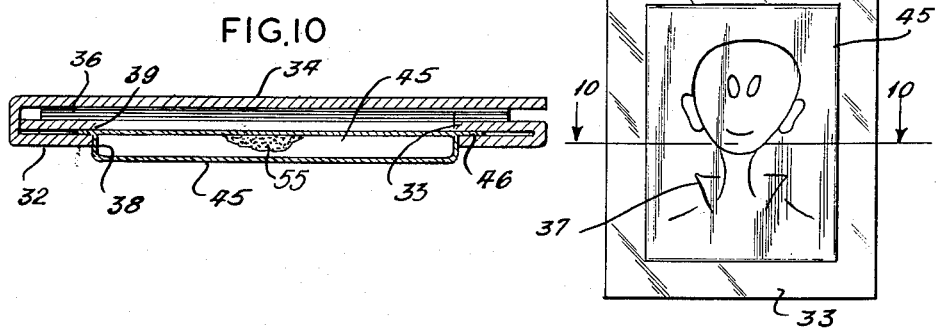
INVENTORS:
LEO V. JACOBSON
BEVERLY W. TAYLOR
BY
ATTORNEYS.

United States Patent Office 3,191,340
Patented June 29, 1965

3,191,340
AMUSEMENT AND EDUCATIONAL DEVICE FOR SELECTIVELY DISPLAYING PICTURES BEHIND A TRANSPARENT CONTAINER CONTAINING LOOSE, SHIFTABLE PIECES
Leo V. Jacobson, 127 W. Swon Ave., Webster Groves, Mo., and Beverly W. Taylor, 1820 St. Catherine Lane, Florissant, Mo.
Filed Mar. 19, 1962, Ser. No. 180,453
4 Claims. (Cl. 46—37)

This invention relates to amusement and educational devices of the kind in which a picture admitting of ornamentation is overlain by a substantially transparent pocket in which loose pieces of ornamenting material are contained. Commonly, such pictures contain magnetic particles, which are moved into position by a magnet or the like. The present invention has application to, but is not directed solely at such an arrangement.

One of the objects of this invention is to provide an amusement and educational device wherein various different illustrations can be brought selectively beneath a substantially transparent pocket, the illustrations being a part of the device.

Another object is to provide such a device which is sturdy, economical and simple to manufacture, and of a size and construction such as to be easily manipulable by children and not liable to being misplaced or broken accidentally.

Other objects will become apparent to those skilled in the art in the light of the following description and accompanying drawing.

In accordance with this invention, generally stated, a device is provided with three leaves, making up either a book-type or "sealed" type device, provided with a window in which its a transparent container or pocket, through which a plurality of pictures can be observed, one at a time, selectively. The pocket contains magnetic particles or other ornamenting material.

Preferably, each of the three leaves is connected along one edge to another of the leaves, so as to form a unitary blank in the first step of their manufacture. In the preferred embodiment, the center leaf forms a frame within which a rotatable disk is mounted. In another embodiment, the central leaf forms a part of a frame for a relatively large, flanged transparent container.

In the drawing,

FIGURE 1 is a plan view of one illustrative embodiment of blank for making the preferred embodiment of device of this invention;

FIGURE 2 is a plan view of a disk element of the preferred embodiment of device of this invention;

FIGURE 3 is a plan view of the blank of FIGURE 1, folded once;

FIGURE 4 is a plan view of the blank of FIGURE 1, fully folded, showing the lower side;

FIGURE 5 is a plan view of the completed device, showing the upper side;

FIGURE 6 is a sectional view taken along the line 6—6 of FIGURE 5;

FIGURE 7 is a top plan view of a blank for making another embodiment of the device of this invention;

FIGURE 8 is a top plan view of the blank of FIGURE 7, folded once;

FIGURE 9 is a top plan view of the finished device, closed, and

FIGURE 10 is a sectional view taken along the line 10—10 of FIGURE 9.

Referring now to the drawing for illustrative embodiments of this invention and particularly to FIGURES 1–6 for the preferred embodiment, reference numeral 1 indicates a completed device of this invention. The device 1 of this invention is made up of an upper leaf 2, a central leaf 3 and a lower leaf 4. The upper leaf 2 has a window 10 and an arcuate slot 11. The central leaf 3 has a large circular aperture 14, which is proportioned to receive a disk 15 in such a way as to permit the disk freely to revolve. The lower leaf 4 is provided with an arcuate slot 25, aligned with the slot 11 in the upper leaf 2.

The disk 15 is rotatably mounted on a rivet 16. In this embodiment, the disk 15 has three fanciful pictures 17, 18 and 19 printed on the side of the disk which faces the upper leaf 2, and positioned so as to appear within the window 10 when the disk is revolved. Finger holes 20 are provided in the disk, and are so arranged that when one of them is at the end of the arcuate slot 11 closest the window 10, one of the pictures adjacent the finger hole will be registered with the window 10.

It can be seen that the disk 15 may be made from the blanked out section of the central leaf 3.

A transparent container 5 of a suitable plastic is mounted in the window 10. The container or pocket 5 is flat topped and circular, and is provided with a flange 6 which provides a glueing surface by which the pocket can be secured to the underside of the upper leaf 2 if desired. In practice the flange 6 may be wide enough so that no glueing is necessary. The container 5 contains particles or pieces 55, which are freely movable within the container 5.

As can be seen from FIGURE 1, the preferred embodiment is made from a unitary blank scored so as to form three hinged panels. In FIGURE 1, the central leaf 3 forms one of the outside panels and the lower leaf 4 forms the other of the outside panels. As can be readily observed, the container 5 is mounted in the window 10 by pushing its top part through until the flange 6 engages the leaf 2, the leaf 3 is folded in, the disk 15 is put in the frame, with the pictures toward the top leaf, and the lower leaf 4 is folded over. The leaves are glued, stapled, or otherwise secured, and the rivet 16 is put through aligned holes in the centers of disk 15 and leaves 2 and 4, to mount the disk 15 for easy rotation.

It can be seen that the blank from which the device is made, can be formed in several different ways. For example, the central leaf can form the central panel of the blank, and the blank can be Z folded. This has the advantage that no double wide score need be made, as is preferably made between the panels 2 and 4 of the illustrative embodiment shown in FIGURE 1. In order to utilize a narrower web, the blank can be made L shaped. If the central leaf is made the upper stem of the L, this form, like the form shown in FIGURE 1, need be printed on only one side of the blank.

In the embodiment shown in FIGURES 7–10, the device is made in the form of a book, with a front cover 30 and a back cover (lower leaf) 34, hinged together at 35. The front cover 30 is made up of an upper leaf 32 and a central leaf 33. The upper and central leaves have large windows 38 and 39 respectively, to provide the front cover with a large window 40, in which a transparent container or pocket 45 is mounted. The container 45 is provided with a flange 46, which is sandwiched between and may, if desired, be adhered to one or both of the upper and central leaves. The back cover 34 has, on its inside face, means for holding a plurality of pictures. In the illustrative embodiment shown, the means is a clip 50, which holds a sheaf or pad 36 of pictures 37, as many as desired of which may be folded back over the top to expose any selected picture.

In the embodiment shown in FIGURES 7–10, as in the embodiment shown in FIGURES 1–6, the blank is preferably unitary, with each of the leaves being hinged along an edge, to another of the leaves. As shown in FIGURE 7, in the preferred arrangement of the "book" embodiment, the central leaf 33 forms an outer panel of the blank. The pocket 45 is mounted with its "dome" projecting through the window 38 of upper leaf 32, and the central leaf 33 is folded over, covering the flange 46 on the pocket 45.

It can be seen that in this arrangement, as in the arrangement shown in FIGURE 1, the panels can be printed on one side, with this way of folding. The book form can also be made with an L-shaped blank, or, Z-folded, with the upper leaf as one outside panel of the blank. In the Z folding arrangement, both sides have to be printed.

As an indication of the preferred size, but not by way of limitation, the commercial embodiment of the disk type device is expected to be about fourteen inches square, with a window about six inches in diameter, and with a disk about thirteen inches in diameter. This is sufficiently large to make "drawing" with the device more inviting, and to make losing of or stepping on the device less likely than if it were smaller.

Numerous variations in the construction of the device of this invention, within the scope of the appended claims, will occur to those skilled in the art in the light of the foregoing disclosure. Thus, for example, it can be seen that the disk of the preferred embodiment can be printed on both sides, and a window provided in the lower leaf, so as to double the number of pictures available. If the rivet is omitted, and one edge left open, replaceable disks can be provided, journaled in the frame provided by the center leaf. A stub rivet projecting from the lower leaf can be used, and the disk-type embodiment made to open like the book-type, so that disks can be put on the rivet and the top cover (upper and central leaves) closed. The book-type embodiment can also be formed with a sort of pocket, closed on three sides, between the upper and lower covers, and the pictures placed in and withdrawn from the pocket. Other covering media besides magnetite particles may be used, such, for example as flat shapes which can double as features or mustaches, or even larger shapes such as hats, may be used, alone or with smaller particles.

Having thus described the invention, what is claimed or desired to be secured by Letters Patent is:

1. An amusement and educational device comprising a one-piece frame having upper, lower and central leaves each hinged to another on an edge and at least the upper and central leaves being secured together flatwise, the upper leaf having an aperture, a flanged transparent container with a part projecting through said upper leaf aperture and with its flange on the underside of said upper leaf, said container containing loose pieces of material shiftable within said container, the central leaf having an aperture below the aperture in the upper leaf, said apertures sufficiently coextensive that a picture framed within the upper leaf aperture and visible therethrough is also framed within the central leaf aperture, and means, connected to the lower leaf and free of said central leaf, mounting a plurality of pictures for selective viewing through said transparent container.

2. The device of claim 1 wherein the pictures are on a thin disk within the compass of the boundaries of the aperture of the central leaf, the aperture of the upper leaf being of a size to admit to view only one complete picture at a time, the rest of said disk being concealed by said upper leaf, the means for mounting said disk being a central pivot, permitting the said disk to revolve.

3. The device of claim 1 wherein the pieces are magnetic.

4. An amusement and educational device comprising a one piece frame having upper, central and lower leaves, the upper leaf having an aperture adapted to receive a shallow container and an arcuate slot of a width to accommodate a manipulating finger, the center leaf having a large aperture adapted to receive a revolvable disk, and the lower leaf having an integral central portion; a substantially transparent shallow container projecting outwardly through the aperture in the upper leaf, said container containing shiftable pieces of material; a picture-carrying disk embraced by said central leaf and lying between the upper and lower leaves, and revolvably mounted in the central leaf aperture, the pictures on said disk, when so mounted, being so positioned on said disk as to be selectively visible through the container as said disk is rotated, said disk having holes positioned to register, successively as the disk rotates, with the arcuate slot in the upper leaf.

References Cited by the Examiner

UNITED STATES PATENTS

| 598,509 | 2/98 | Hall | 40—70 |
| 1,074,533 | 9/13 | Schowalter | 46—37 X |
| 1,177,652 | 4/16 | Robertson | 40—70 |
| 1,549,197 | 8/25 | Hanback | 46—37 X |
| 2,853,830 | 9/58 | Herzog | 46—35 |
| 3,032,926 | 5/62 | Lang | 46—37 X |

FOREIGN PATENTS

| 458,834 | 8/50 | Italy. |

DELBERT B. LOWE, *Primary Examiner.*
JAMES W. LOVE, *Examiner.*